United States Patent
Zhen et al.

(10) Patent No.: US 11,128,809 B2
(45) Date of Patent: Sep. 21, 2021

(54) SYSTEM AND METHOD FOR COMPOSITING HIGH DYNAMIC RANGE IMAGES

(71) Applicant: Samsung Electronics Co., Ltd., Suwon-si (KR)

(72) Inventors: Ruiwen Zhen, Allen, TX (US); John Glotzbach, Allen, TX (US); Ibrahim Pekkucuksen, Plano, TX (US); Hamid R. Sheikh, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/277,630

(22) Filed: Feb. 15, 2019

(65) Prior Publication Data
US 2020/0267300 A1    Aug. 20, 2020

(51) Int. Cl.
*H04N 5/235*    (2006.01)
*G06T 5/00*    (2006.01)
(Continued)

(52) U.S. Cl.
CPC .......... *H04N 5/2355* (2013.01); *G06T 5/007* (2013.01); *G06T 5/40* (2013.01); *G06T 7/20* (2013.01);
(Continued)

(58) Field of Classification Search
CPC ............... H04N 5/2355; H04N 5/2351; H04N 5/23254; H04N 5/23267; G06T 5/40;
(Continued)

(56) References Cited

U.S. PATENT DOCUMENTS 8,866,922 B2    10/2014    Tsubaki
9,240,038 B2    1/2016    Chen
(Continued)

FOREIGN PATENT DOCUMENTS

KR    1020080076004 A    8/2008
KR    1020130031574 A    3/2013
(Continued)

OTHER PUBLICATIONS

Li, A. et al., "An Improved FAST+SURF Fast Matching Algorithm", Procedia Computer Science 107, International Congress of Information and Communication Technology, 2017, 7 pages.
(Continued)

*Primary Examiner* — Shahbaz Nazrul

(57) ABSTRACT

An electronic device, method, and computer readable medium for compositing high dynamic range frames are provided. The electronic device includes a camera, and a processor coupled to the camera. The processor registers the plurality of multi-exposure frames with a hybrid of matched features to align non-reference frames with a reference frame; generates blending maps of the plurality of multi-exposure frames to reduce moving ghost artifacts and identify local areas that are well-exposed in the plurality of multi-exposure frames; and blends the plurality of multi-exposure frames weighted by the blending maps using a two-step weight-constrained exposure fusion technique into a high dynamic range (HDR) frame.

20 Claims, 10 Drawing Sheets

(51) Int. Cl.
  *G06T 7/44* (2017.01)
  *G06T 7/20* (2017.01)
  *G06T 5/40* (2006.01)

(52) U.S. Cl.
  CPC ...... *G06T 7/44* (2017.01); *G06T 2207/20208* (2013.01)

(58) Field of Classification Search
  CPC .. G06T 5/007; G06T 7/44; G06T 7/20; G06T 2207/20208; G06T 2207/10016; G06T 2207/10144; G06T 5/50; G06T 5/008
  See application file for complete search history.

(56) References Cited

U.S. PATENT DOCUMENTS

| | | | |
|---|---|---|---|
| 9,317,909 B2 | 4/2016 | Kim | |
| 10,165,194 B1* | 12/2018 | Baldwin | H04N 5/2355 |
| 2004/0100565 A1 | 5/2004 | Chen et al. | |
| 2006/0177150 A1* | 8/2006 | Uyttendaele | G06T 3/4038 |
| | | | 382/284 |
| 2008/0192131 A1 | 8/2008 | Kim et al. | |
| 2010/0271512 A1* | 10/2010 | Garten | G09G 5/06 |
| | | | 348/239 |
| 2011/0254976 A1* | 10/2011 | Garten | G06F 3/1454 |
| | | | 348/229.1 |
| 2012/0050474 A1* | 3/2012 | Segall | G06T 5/50 |
| | | | 348/43 |
| 2012/0218442 A1* | 8/2012 | Jandhyala | G06T 5/50 |
| | | | 348/239 |
| 2013/0100314 A1* | 4/2013 | Li | H04N 5/2353 |
| | | | 348/229.1 |
| 2014/0307044 A1 | 10/2014 | Sharma et al. | |
| 2015/0002704 A1 | 1/2015 | Vidal-Naquet | |
| 2015/0009355 A1* | 1/2015 | Peng | H04N 5/2355 |
| | | | 348/222.1 |
| 2015/0043811 A1 | 2/2015 | Prabhudesai et al. | |
| 2016/0093029 A1* | 3/2016 | Micovic | H04N 5/232 |
| | | | 348/229.1 |
| 2016/0148356 A1* | 5/2016 | Dabral | G06T 5/007 |
| | | | 382/166 |
| 2017/0302838 A1 | 10/2017 | Yang et al. | |

FOREIGN PATENT DOCUMENTS

| | | |
|---|---|---|
| KR | 10-2015-0019985 A | 2/2015 |
| KR | 101633893 B1 | 6/2016 |
| KR | 10-1698876 B1 | 1/2017 |
| KR | 10-2018-0132210 A | 12/2018 |

OTHER PUBLICATIONS

Li, X. et al., "Multi-exposure high dynamic range image synthesis with camera shake corrections", Proceedings of SPIE, Applied Optics and Photonics China, 2017, 6 pages, Beijing, China.
Swathi, R., "Satellite Image Co-Registration Based on Hybrid Invariant Local Features", Journal of Theoretical and Applied Information Technology, Aug. 15, 2017, 9 pages. vol. 95, No. 15.
International Search Report and Written Opinion of the International Searching Authority regarding International Patent Application No. PCT/KR2019/014937 dated Feb. 21, 2020, 10 pages.

* cited by examiner

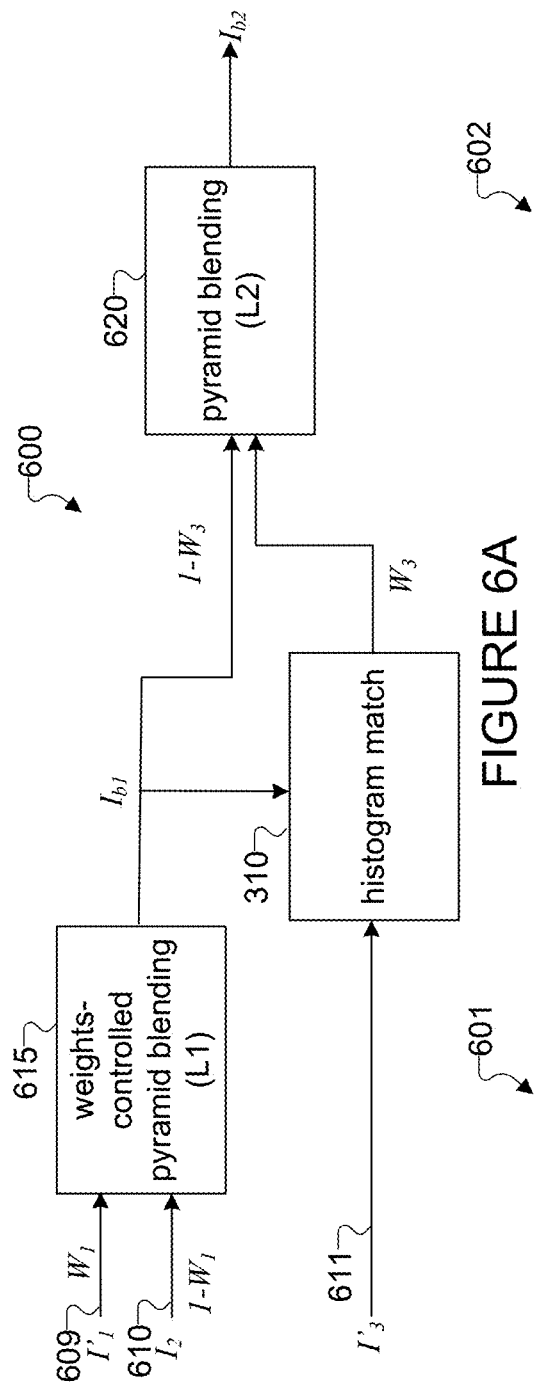
FIGURE 6A
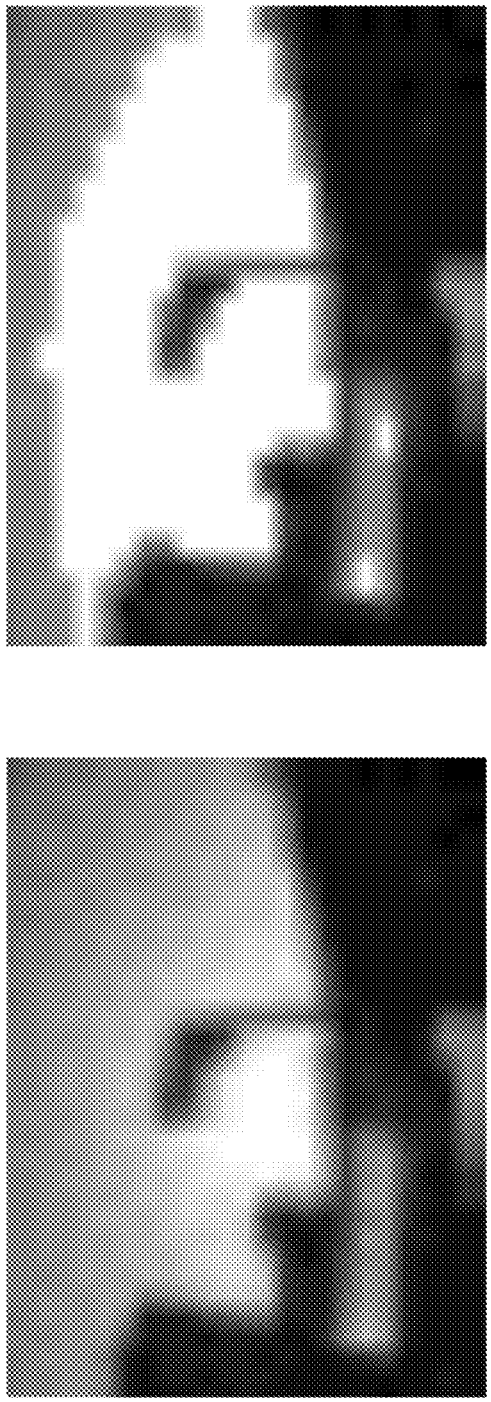
FIGURE 6B
FIGURE 6C

SYSTEM AND METHOD FOR COMPOSITING HIGH DYNAMIC RANGE IMAGES

TECHNICAL FIELD

This disclosure relates generally to systems for image processing. More specifically, this disclosure relates to systems and methods for compositing high dynamic range images.

BACKGROUND

A natural scene often has a high dynamic range (HDR) that exceeds the capture range of common digital cameras. Therefore, a single digital photo is often insufficient to provide all the details in a scene due to under- or over-exposed regions. To capture details about the entire scene, it is necessary to capture images under multiple exposure settings.

SUMMARY

In one embodiment, an electronic device provides for compositing high dynamic range frames. The electronic device includes a camera, and a processor coupled to the camera. The processor registers the plurality of multi-exposure frames with a hybrid of matched features to align non-reference frames with a reference frame; generates blending maps of the plurality of multi-exposed frames to reduce moving ghost artifacts and identify local areas that are well-exposed in the plurality of multi-exposed frames; and blends the plurality of multi-exposure frames weighted by the blending maps using a two-step weight-constrained exposure fusion technique into a high-dynamic range (HDR) frame.

In a second embodiment, a method provides for compositing high dynamic range frames. The method includes registering the plurality of multi-exposure frames with a hybrid of matched features to align non-reference frames with a reference frame; generating blending maps of the plurality of multi-exposed frames to reduce moving ghost artifacts and identify local areas that are well-exposed in the plurality of multi-exposed frames; and blending the plurality of multi-exposure frames weighted by the blending maps using a two-step weight-constrained exposure fusion technique into a high-dynamic range (HDR) frame.

In a third embodiment, a non-transitory medium embodying a computer program provides for compositing high dynamic range frames. The program code, when executed by at least one processor, causes a processor to register the plurality of multi-exposure frames with a hybrid of matched features to align non-reference frames with a reference frame; generate blending maps of the plurality of multi-exposed frames to reduce moving ghost artifacts and identify local areas that are well-exposed in the plurality of multi-exposed frames; and blend the plurality of multi-exposure frames weighted by the blending maps using a two-step weight-constrained exposure fusion technique into a high-dynamic range (HDR) frame.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description, taken in conjunction with the accompanying drawings, in which:

FIG. 6A illustrates an example of a block diagram of a two-step weights-constrained exposure fusion according to embodiments of the present disclosure;

FIG. 6B illustrates an example of an original blending weight map at level 8 for the short-exposure image of the example in FIG. 5A according to embodiments of the present disclosure;

FIG. 6C illustrates an example of a constrained blending weight map at level 8 for the short-exposure image of the example in FIG. 5A according to embodiments of the present disclosure;

DETAILED DESCRIPTION

Figure 1:
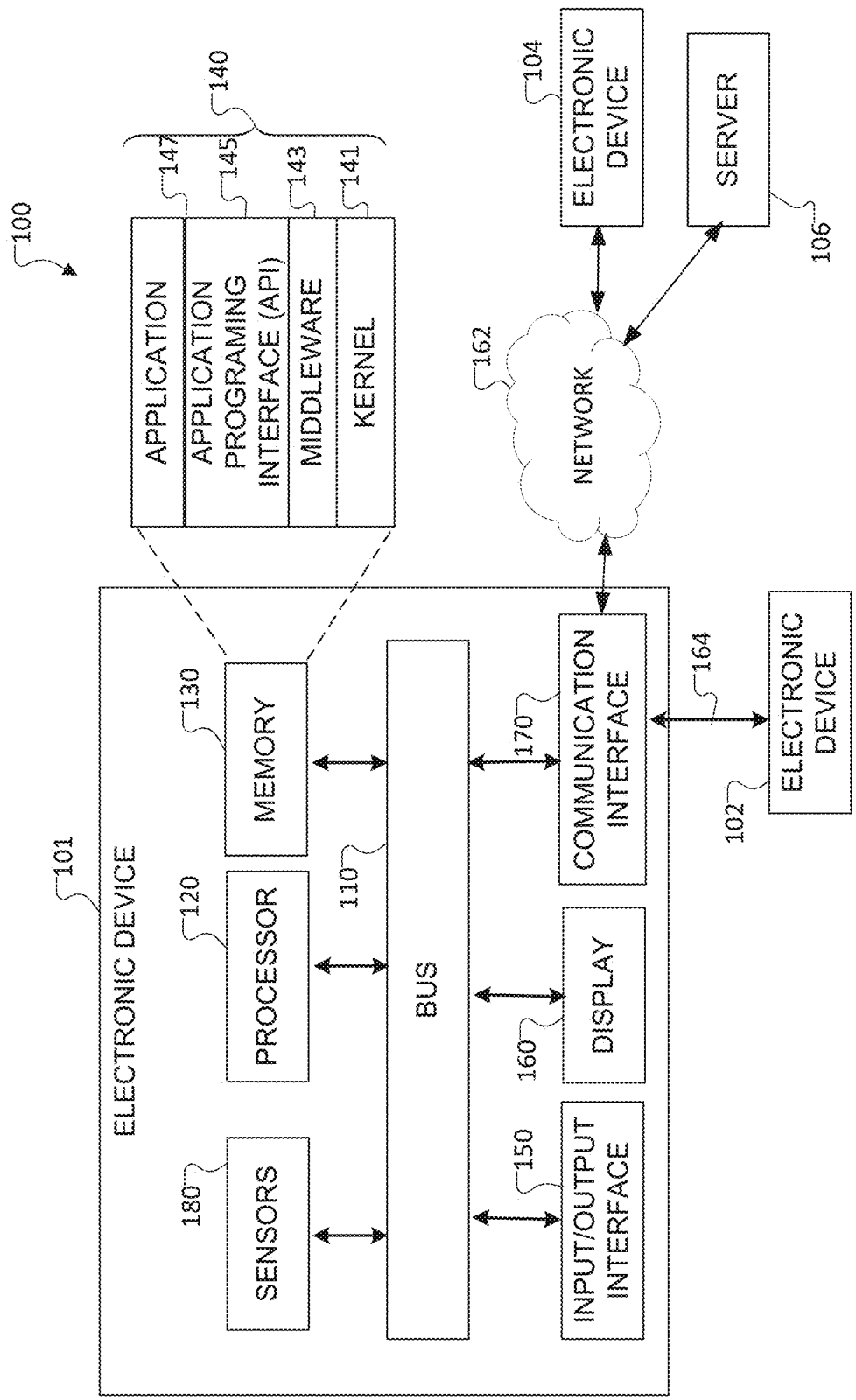
FIG. 1 illustrates an example network configuration according to embodiments of the present disclosure.

FIGS. 1 through 7, discussed below, and the various embodiments of the present disclosure are described with reference to the accompanying drawings. However, it should be appreciated that the present disclosure is not limited to the embodiments and all changes and/or equivalents or replacements thereto also belong to the scope of the present disclosure. The same or similar reference denotations may be used to refer to the same or similar elements throughout the specification and the drawings.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and do not limit the components. These terms are only used to distinguish one component from another. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts.

For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "an," and "the" include plural references unless the context clearly dictates otherwise. All terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a PDA (personal digital assistant), a portable multimedia player (PMP), an MP3 player, a mobile medical device, a camera, or a wearable device (e.g., smart glasses, a head-mounted device (HMD), electronic clothes, an electronic bracelet, an electronic necklace, an electronic appcessory, an electronic tattoo, a smart mirror, or a smart watch).

Definitions for other certain words and phrases are provided throughout this patent document. Those of ordinary skill in the art should understand that in many if not most instances, such definitions apply to prior as well as future uses of such defined words and phrases.

According to embodiments of the present disclosure, the electronic device may be a smart home appliance. Examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™ APPLE TV™, or GOOGLE TV™), a gaming console (XBOX™, PLAYSTATION™), an electronic dictionary, an electronic key, a camcorder, or an electronic picture frame.

According to an embodiment of the present disclosure, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or Internet of Things devices (e.g., a bulb, various sensors, an electric or gas meter, a sprinkler, a fire alarm, a thermostat, a street light, a toaster, fitness equipment, a hot water tank, a heater, or a boiler).

According to certain embodiments of the disclosure, the electronic device can be at least one of a part of a piece of furniture or building/structure, an electronic board, an electronic signature receiving device, a projector, or various measurement devices (e.g., devices for measuring water, electricity, gas, or electromagnetic waves).

According to embodiments of the present disclosure, the electronic device is one or a combination of the above-listed devices. According to embodiments of the present disclosure, the electronic device is a flexible electronic device. The electronic device disclosed herein is not limited to the above-listed devices, and can include new electronic devices depending on the development of technology.

Hereinafter, electronic devices are described with reference to the accompanying drawings, according to various embodiments of the present disclosure. As used herein, the term "user" may denote a human or another device (e.g., an artificial intelligent electronic device) using the electronic device.

This application describes a method of fusing a set of multi-exposure images of a scene into a single HDR image where all scene areas appear well-exposed. The proposed method is optimized for HDR applications in which image information is lost in some of the images and image intensity is absolutely different among input images. This application addresses aligning multi-exposure input images, generating blending maps that reduce ghost artifacts in the presence of moving objects, and producing a halo-free HDR image using exposure fusion technique. While the term "image" is used in the description, the application also applies to video. The term "frame" can refer to an image frame or a video frame.

The application provides methods for globally registering multi-exposure images with a hybrid of matched features that combine ORB features and local features computed from a block search. The application also provides a deghosting approach to reduce moving artifacts while bringing back the most information from over or under-exposed images. This deghosting approach adds local analysis of motion, textures and well-exposedness to adapt to multi-exposure cases. This application also provides a two-step weights-constrained exposure fusion technique to overcome either the halo artifact or information lost that appears in the result from the original exposure technique.

As some of the image information is not present in under or over exposed images, ORB features usually concentrate on small areas of the image that leads to a global transformation matrix biased for that local area instead of the whole image. With the incorporation of local features computed from block search, the features are distributed across the entire image and the computed transformation matrix can better compensate global camera motion.

Image difference is a good indicator of moving objects, where no blending is desired. However, in HDR applications, exposure difference is another source contributing to image difference and more blending is preferred so that details from under- or over-exposed images can be recovered. The proposed deghosting map can effectively differentiate the two kinds of images differences so that image details are blended while ghost artifacts are significantly suppressed.

In the exposure fusion technique, the multi-exposure images are blended in a multi-resolution (pyramid) manner. When the number of pyramid levels is small, the blending output suffers from halo artifacts. However, if the number of pyramid levels is increased, the blending output will exceed image intensity range and be clipped, and thus information in the extreme intensities will be lost. The novel two-step weights-constrained exposure fusion technique can preserve all the information in the blending output without generating noticeable halo artifacts.

FIG. 1 illustrates an example network configuration 100 according to various embodiments of the present disclosure. The embodiment of the network configuration 100 shown in FIG. 1 is for illustration only. Other embodiments of the network configuration 100 could be used without departing from the scope of this disclosure.

According to an embodiment of the present disclosure, an electronic device 101 is included in a network environment 100. The electronic device 101 may include at least one of a bus 110, a processor 120, a memory 130, an input/output (IO) interface 150, a display 160, a communication interface 170, or sensors 180. In some embodiments, the electronic device 101 may exclude at least one of the components or may add another component.

The bus 110 includes a circuit for connecting the components 120 to 170 with one another and transferring communications (e.g., control messages and/or data) between the components.

The processor 120 includes one or more of a central processing unit (CPU), an application processor (AP), or a communication processor (CP). The processor 120 is able to perform control on at least one of the other components of the electronic device 101, and/or perform an operation or data processing relating to communication.

For example, the processor 120 can receive a plurality of multi-exposure images captured by the camera during a capture event. The processor 120 can register the multi-exposure images to align with a reference image. The processor 120 can generate blending maps which determine a normalized amount for each image. The processor 120 can synthesize ghost-free images for a low-exposure image and a high-exposure image. The processor 120 can performs a two-step weights-constrained exposure fusion on the plurality of multi-exposure images. In the first step, the processor 120 can blend the ghost-free low-exposure image with the reference image using blending maps $W_1$ and $1-W_1$. In the second step, the processor 120 can blend the output image from the first step with the ghost-free high-exposure image using blending maps $W_3$ and $1-W_3$. The processor 120 can apply a global tone mapping curve to the image output from the two-step weights-constrained exposure fusion in order to brighten-up any dark areas and increase image contrast. The processor 120 can apply noise filtering and edge enhancement to the image. The processor 120 can operate the display to display the completed HDR image.

The memory 130 can include a volatile and/or non-volatile memory. For example, the memory 130 can store commands or data related to at least one other component of the electronic device 101. According to an embodiment of the present disclosure, the memory 130 can store software and/or a program 140. The program 140 includes, e.g., a kernel 141, middleware 143, an application programming interface (API) 145, and/or an application program (or "application") 147. At least a portion of the kernel 141, middleware 143, or API 145 may be denoted an operating system (OS).

For example, the kernel 141 can control or manage system resources (e.g., the bus 110, processor 120, or a memory 130) used to perform operations or functions implemented in other programs (e.g., the middleware 143, API 145, or application program 147). The kernel 141 provides an interface that allows the middleware 143, the API 145, or the application 147 to access the individual components of the electronic device 101 to control or manage the system resources.

The middleware 143 can function as a relay to allow the API 145 or the application 147 to communicate data with the kernel 141, for example. A plurality of applications 147 can be provided. The middleware 143 is able to control work requests received from the applications 147, e.g., by allocating the priority of using the system resources of the electronic device 101 (e.g., the bus 110, the processor 120, or the memory 130) to at least one of the plurality of applications 134.

The API 145 is an interface allowing the application 147 to control functions provided from the kernel 141 or the middleware 143. For example, the API 145 includes at least one interface or function (e.g., a command) for filing control, window control, image processing or text control.

The IO interface 150 serve as an interface that can, e.g., transfer commands or data input from a user or other external devices to other component(s) of the electronic device 101. Further, the IO interface 150 can output commands or data received from other component(s) of the electronic device 101 to the user or the other external device.

The display 160 includes, e.g., a liquid crystal display (LCD), a light emitting diode (LED) display, an organic light emitting diode (OLED) display, or a microelectromechanical systems (MEMS) display, or an electronic paper display. The display 160 is able to display, e.g., various contents (e.g., text, images, videos, icons, or symbols) to the user. The display 160 can include a touchscreen and may receive, e.g., a touch, gesture, proximity or hovering input using an electronic pen or a body portion of the user.

For example, the communication interface 170 is able to set up communication between the electronic device 101 and an external electronic device (e.g., a first electronic device 102, a second electronic device 104, or a server 106). For example, the communication interface 170 can be connected with the network 162 or 164 through wireless or wired communication to communicate with the external electronic device. The communication interface 170 can be a wired or wireless transceiver or any other component for transmitting and receiving signals.

Electronic device 101 further includes one or more sensors 180 that can meter a physical quantity or detect an activation state of the electronic device 101 and convert metered or detected information into an electrical signal. For example, sensor 180 may include one or more buttons for touch input, a camera, a gesture sensor, a gyroscope or gyro sensor, an air pressure sensor, a magnetic sensor or magnetometer, an acceleration sensor or accelerometer, a grip sensor, a proximity sensor, a color sensor (e.g., a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an IR sensor, an ultrasound sensor, an iris sensor, a fingerprint sensor, etc. The sensor(s) 180 can further include a control circuit for controlling at least one of the sensors included therein. Any of these sensor(s) 180 may be located within the electronic device 101. A camera sensor 180 can capture a plurality of frames for a single image to be combined by the processor 120.

The first external electronic device 102 or the second external electronic device 104 may be a wearable device or an electronic device 101-mountable wearable device (e.g., a head mounted display (HMD)). When the electronic device 101 is mounted in a HMD (e.g., the electronic device 102), the electronic device 101 is able to detect the mounting in the HMD and operate in a virtual reality mode. When the electronic device 101 is mounted in the electronic device 102 (e.g., the HMD), the electronic device 101 can communicate with the electronic device 102 through the communication interface 170. The electronic device 101 can be directly connected with the electronic device 102 to communicate with the electronic device 102 without involving with a separate network.

The wireless communication is able to use at least one of, e.g., long term evolution (LTE), long term evolution-advanced (LTE-A), 5th generation wireless system (5G), mm-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include at least one of universal serial bus (USB), high definition multimedia interface (HDMI), recommended standard 232 (RS-232), or plain old telephone service (POTS).

The network 162 includes at least one of communication networks, e.g., a computer network (e.g., local area network (LAN) or wide area network (WAN)), Internet, or a telephone network.

The first and second external electronic devices 102 and 104 and server 106 each can be a device of the same or a different type from the electronic device 101. According to certain embodiments of the present disclosure, the server 106 includes a group of one or more servers. According to certain embodiments of the present disclosure, all or some of operations executed on the electronic device 101 can be executed on another or multiple other electronic devices (e.g., the electronic devices 102 and 104 or server 106). According to certain embodiments of the present disclosure, when the electronic device 101 should perform some function or service automatically or at a request, the electronic device 101, instead of executing the function or service on its own or additionally, can request another device (e.g., electronic devices 102 and 104 or server 106) to perform at least some functions associated therewith. The other electronic device (e.g., electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example.

Although FIG. 1 shows that the electronic device 101 includes the communication interface 170 to communicate with the external electronic device 104 or server 106 via the network 162, the electronic device 101 may be independently operated without a separate communication function, according to an embodiment of the present disclosure.

The server 106 can support to drive the electronic device 101 by performing at least one of operations (or functions) implemented on the electronic device 101. For example, the server 106 can include a processing module or processor that may support the processor 120 implemented in the electronic device 101.

Although FIG. 1 illustrates one example of a communication system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2A:
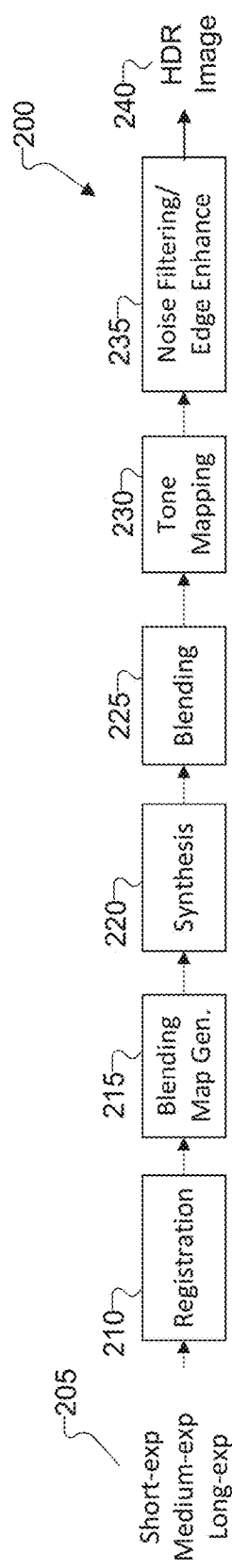
FIG. 2A illustrates an example of a HDR flow chart according to embodiments of the present disclosure.
Figure 2B:
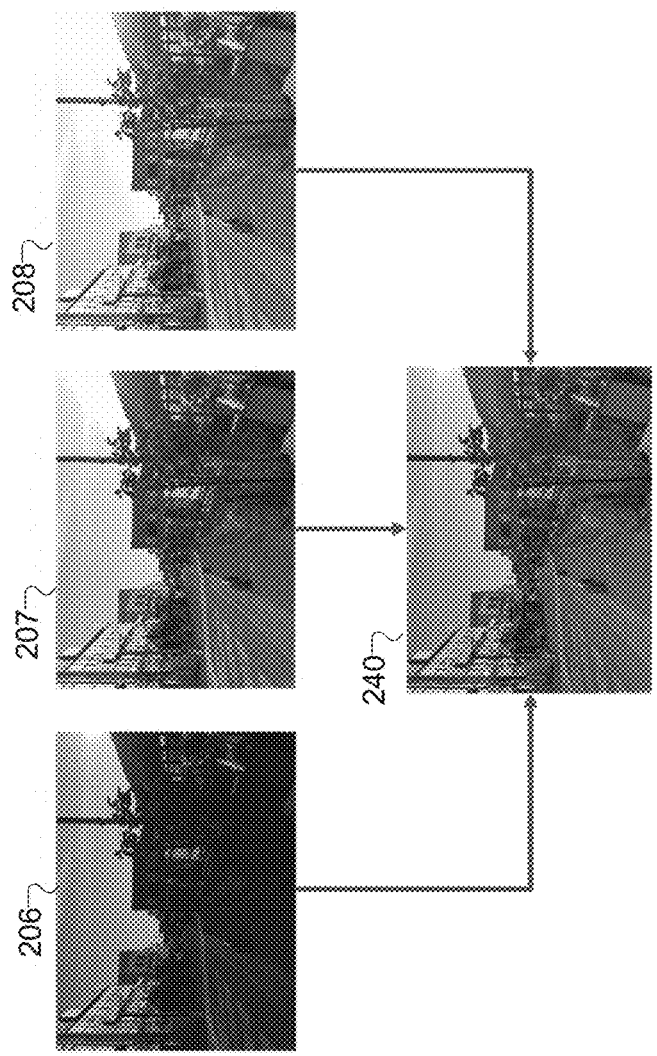
FIG. 2B illustrates an example of combining multi-exposure images into an HDR image according to embodiments of the present disclosure

FIG. 2A illustrates an example of a HDR flow chart 200 according to embodiments of the present disclosure. FIG. 2B illustrates an example of combining 201 multi-exposure images into an HDR image according to embodiments of the present disclosure. The embodiments of the HDR flow chart 200 and combining 201 into an HDR image shown in FIGS. 2A and 2B are for illustration only. Other embodiments of the HDR flow chart 200 and combining 201 into an HDR image could be used without departing from the scope of this disclosure.

The HDR flow chart 200 provides a series of operations for creating an HDR image 240 from a plurality of multi-exposure images 205. The HDR flow chart 200 includes receiving a plurality of multi-exposure image 205 including a short-exposure image 206, a medium-exposure image 207, and a long-exposure image 208; performing registration 210 on the plurality of multi-exposure images 205; performing blending map generation 215 for the plurality of multi-exposure images 205 after registration 210; performing synthesis 220 for the plurality of multi-exposure images 205 after registration 210; performing blending 225 for the plurality of multi-exposure images 205 after registration 210; performing tone mapping 230 and noise filtering/edge enhancement 235 for the blending output from 225; and outputting an HDR image 240.

The plurality of multi-exposure images 205 includes at least a short-exposure image 206 (or low-exposure image), a medium-exposure image 207, and a long-exposure image 208 (or high-exposure image). The medium-exposure image 207 can be an image captured with a standard or default exposure time. The short-exposure image 206 is an image captured with a lower or shorter exposure time than the medium-exposure image 207. The long-exposure image 208 is an image captured with a longer or higher exposure time than the medium-exposure image 207. While the medium-exposure image is described as a default amount of time for exposure, the default could also be set to the short-exposure image 206 or the long-exposure image 208. When the short-exposure image 206 is set to default, the camera will continue to capture the medium-exposure image 207 and the long-exposure image 208. When the long-exposure image is set to default, the camera will capture images at fractions of the default time for the short-exposure image 206 and the medium-exposure image 207. The differences between the short-exposure image 206, the medium-exposure image 207, and the long-exposure image 208 can be an amount of time or an exposure-related measurement, which can also be uniform or different.

Most other methods choose to use an image with most details as the reference image, usually the short-exposure one, but using a short-exposure image as reference frame may degrade image quality due to excessive noise. Therefore, the medium-exposure image 207 will be used as the reference image in the following. The choice of reference frame provides benefits on image quality.

A reference image is selected out of the plurality of multi-exposure images 205, with the rest of the images used being non-reference images. In the examples herein, the medium-exposure image 207 is the reference image and the short-exposure image 206 and the long-exposure image 208 are non-reference images. The reference image can be referred to as a second image. At least one non-reference image used has a lower exposure time than the reference image (low-exposure image 206), which can be referred to as a first image. At least one non-reference image used has a longer exposure time than the reference image (long-exposure image 208), which can be referred to as a third image.

The registration block 210 aligns the non-reference images with the reference image. The registration block 210 is further described in detail in relation to FIGS. 3A-3E.

The blending map generation block 215 generates blending maps each of which is a composite of a deghosting map and a well-exposed map. The blending map generation block 215 is further described in detail in relation to FIGS. 4A-4C.

The synthesis block 220 uses the blending maps from the blending map generation block 215 to synthesize new ghost-free images for the first image $I_1'$ and the third image $I_3'$ in which the moving area are filled by histogram-matched reference image $I_2$.

The blending block 225 performs a two-step weight-constrained exposure fusion process on the ghost-free first image $I_1'$ and ghost-free third image $I_3'$ along with the reference image $I_2$. The blending block 225 is further described in detail in relation to FIGS. 6A-6E.

The tone mapping block 230 applies a global tone mapping curve on the blending output to brighten-up the dark areas and increase image contrast.

The noise filtering/edge enhancement block 235 performs noise filtering and edge enhancement on the image output from the tone mapping block 230. The noise filtering/edge enhancement strength is spatially varying. For image areas that mainly come from short-exposure image $I_1$, the noise filtering strength is the highest and the edge enhancement strength the lowest. The opposite is true for the long-exposure image $I_3$, where the noise filtering strength is the lowest and the edge enhancement strength is the highest. The noise filtering strength describes the amount of details that can be pulled from one of the multi-exposure images for the purpose of noise filtering. The edge enhancement strength describes the amount of details that can be pulled, or extracted, from one of the multi-exposure images for the purpose of edge enhancement.

Figure 3A:
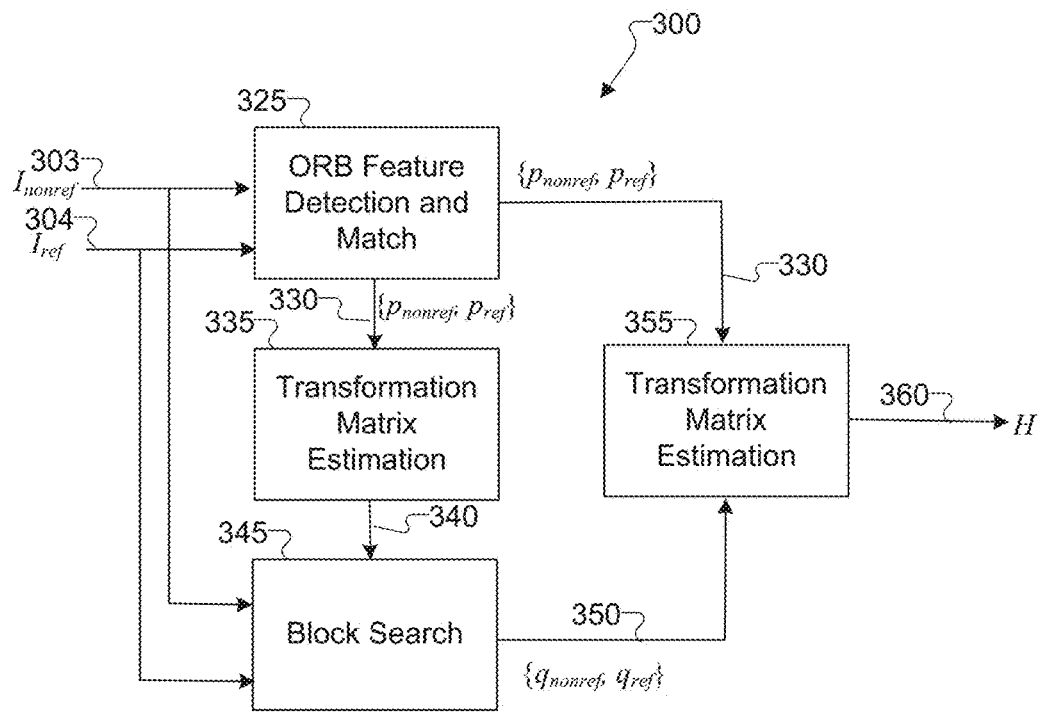
FIG. 3A illustrates an example of using block search to expand matched features according to embodiments of the present disclosure.
Figures 3D, 3E:
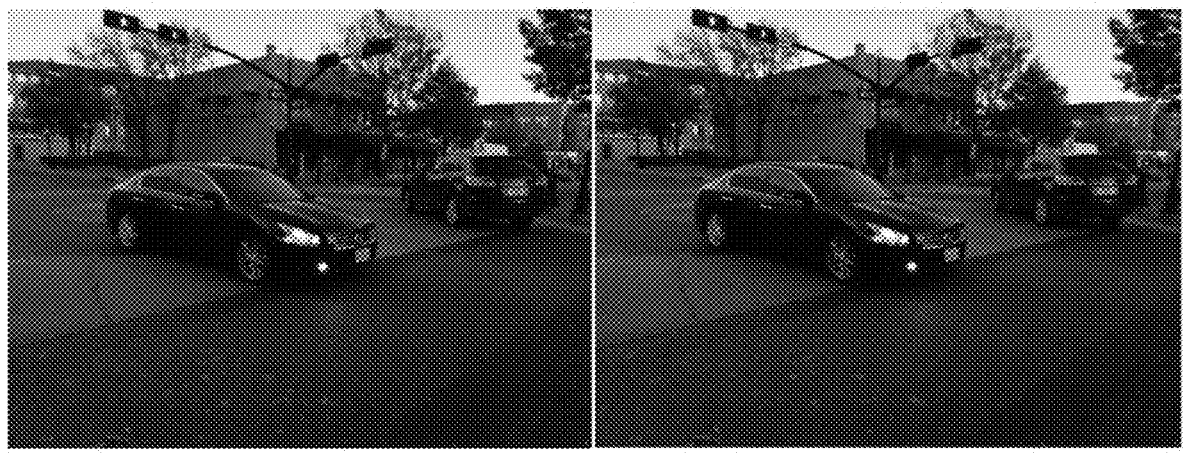
FIG. 3D illustrates an example of overlapping a reference image and a non-reference image warped by the transformation matrix estimated from ORB features according to embodiments of the present disclosure.
FIG. 3E illustrates an example of overlapping a reference image and a non-reference image warped by the transformation matrix estimated from expanded matched features according to embodiments of the present disclosure.
Figure 3B:
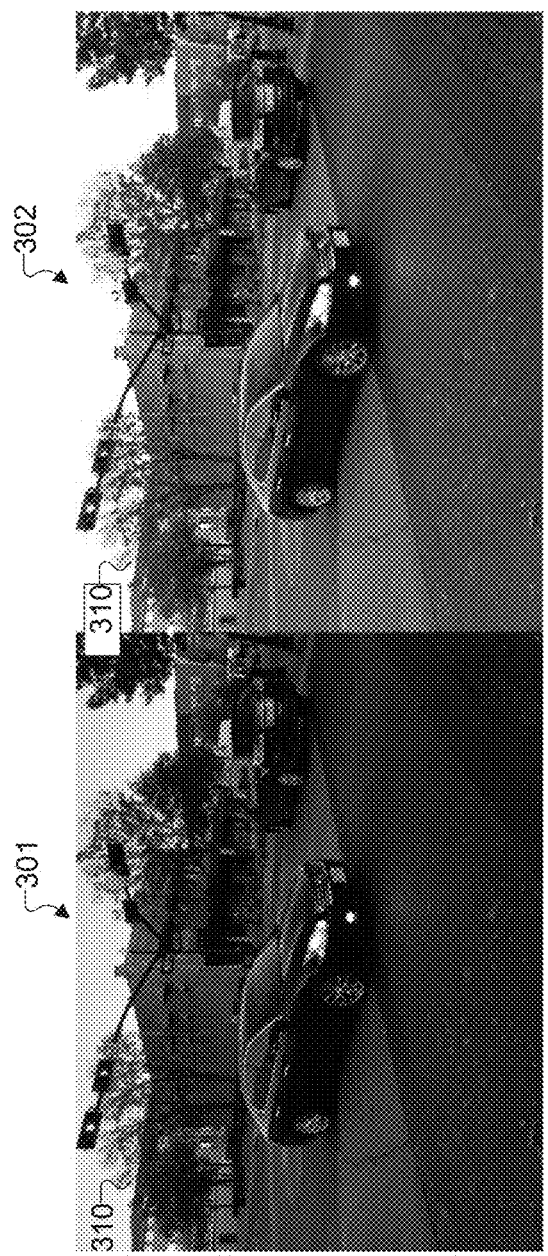
FIG. 3B illustrates an example of matched ORB features (global oriented features from accelerated segment test (FAST) and rotated binary robust independent elementary features (BRIEF)) between a non-reference image and a reference image according to embodiments of the present disclosure.
Figure 3C:
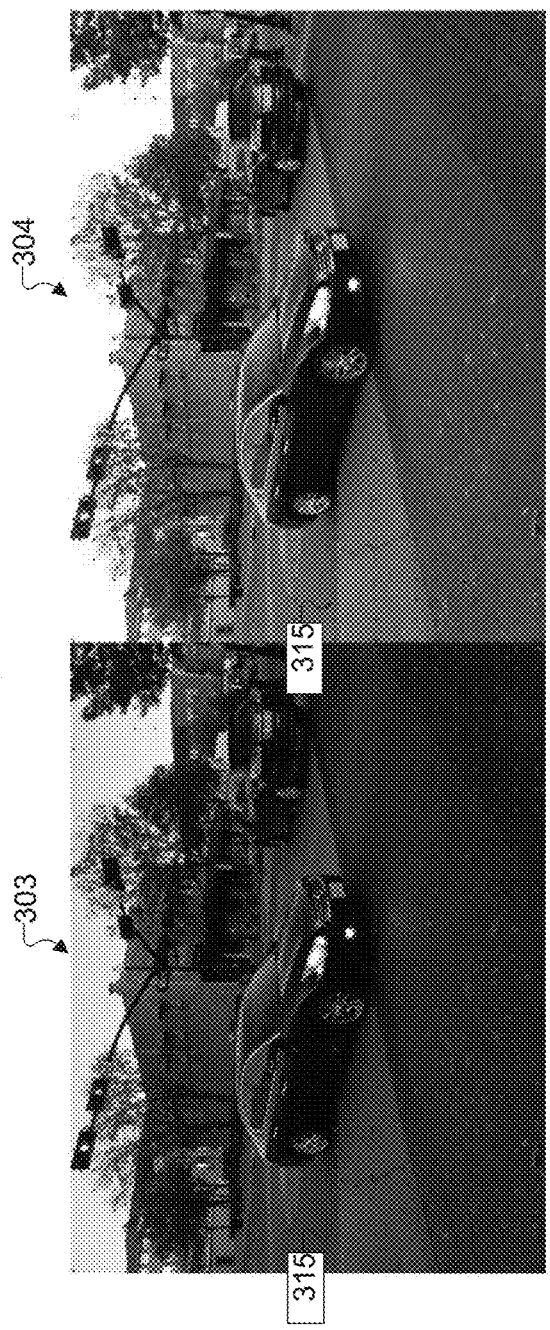
FIG. 3C illustrates an example of expanded matched features including ORB features and local matched features between a non-reference image and a reference image according to embodiments of the present disclosure.

FIG. 3A illustrates an example of using block search 300 to expand matched features according to embodiments of the present disclosure. FIG. 3B illustrates an example of matched ORB features 310 between a non-reference image 301 and a reference image 302 according to embodiments of the present disclosure. FIG. 3C illustrates an example of expanded matched features 315 including ORB features and local matched features between a non-reference image 303 and a reference image 304 according to embodiments of the present disclosure. FIG. 3D illustrates an example of overlapping a reference image with a non-reference image warped by the transformation matrix estimated from ORB features according to embodiments of the present disclosure. FIG. 3E illustrates an example of overlapping a reference image with a non-reference image warped by the transformation matrix estimated from expanded features according to embodiments of the present disclosure. The embodiment of the block search 300 shown in FIG. 3A, the matched ORB features 310 in FIG. 3B, the expanded matched features 315 in FIG. 3C, the registration performance using ORB features only 305 in FIG. 3D, and the registration performance using expanded features 306 in FIG. 3E are for illustration only. Other embodiments of the block search, the matched ORB features 310, the expanded matched features 315, the registration performance using ORB features only 305, and the registration performance using expanded features 306 could be used without departing from the scope of this disclosure.

Registering multiple constant-exposed images is well addressed by fitting a transformation matrix to matched feature points, such as ORB features 310. The performance is degraded if a large object is moving in the scene due to a feature outlier rejection algorithm that regards the feature points on the background as outliers. This situation gets worse in a multi-exposure case where image information is not identical in all images. For highly bright or dark regions, detection and matching of feature points is difficult.

The processor 102 detects and matches ORB features 325 between the reference image 304 and the non-reference image 303 to determine a set of matched ORB features 330. The processor 102 performs transformation matrix estimation 335 on the set of matched ORB features 330 to determine a transformation matrix 340. FIG. 3B shows the matched ORB features 310, between the first image $I_1$ 301 and the second image $I_2$ 302, which concentrate in a local texture area. The transformation matrix 340 computed from this set of features causes significant misalignment in non-feature areas and consequently decreases blending levels.

To improve registration performance for the entire image, an extra set of matched local features 350 is designed to cover a large portion of the image (refer to block diagram in FIG. 3A). The processor 102 performs a block search 345 with inputs of the reference image 304, the non-reference image 303, and the transformation matrix 340. The block search 345 outputs the extra set of matched local features 350. For the block search 345, the non-reference image 303 is divided into a grid of blocks, and the center of each block is assumed to be a local feature point. For each block, the corresponding block in the reference image 304 is searched using a normalized cross correlation where the search radius is guided by the transformation matrix 340 from ORB features 330. The center of the corresponding block will be treated as the matched feature point. An outlier rejection is performed on those local feature points to remove the inconsistent points, e.g., feature points on moving objects. The remaining local feature points 350 will be combined with the ORB feature points 330, as shown in FIG. 3C, and fed into a transformation matrix estimation 355, which outputs a transformation matrix 360. The registration performance 305 without the local feature points illustrated in FIG. 3D is compared to the registration performance 306 with the local feature points illustrated in FIG. 3E.

Figure 4A:
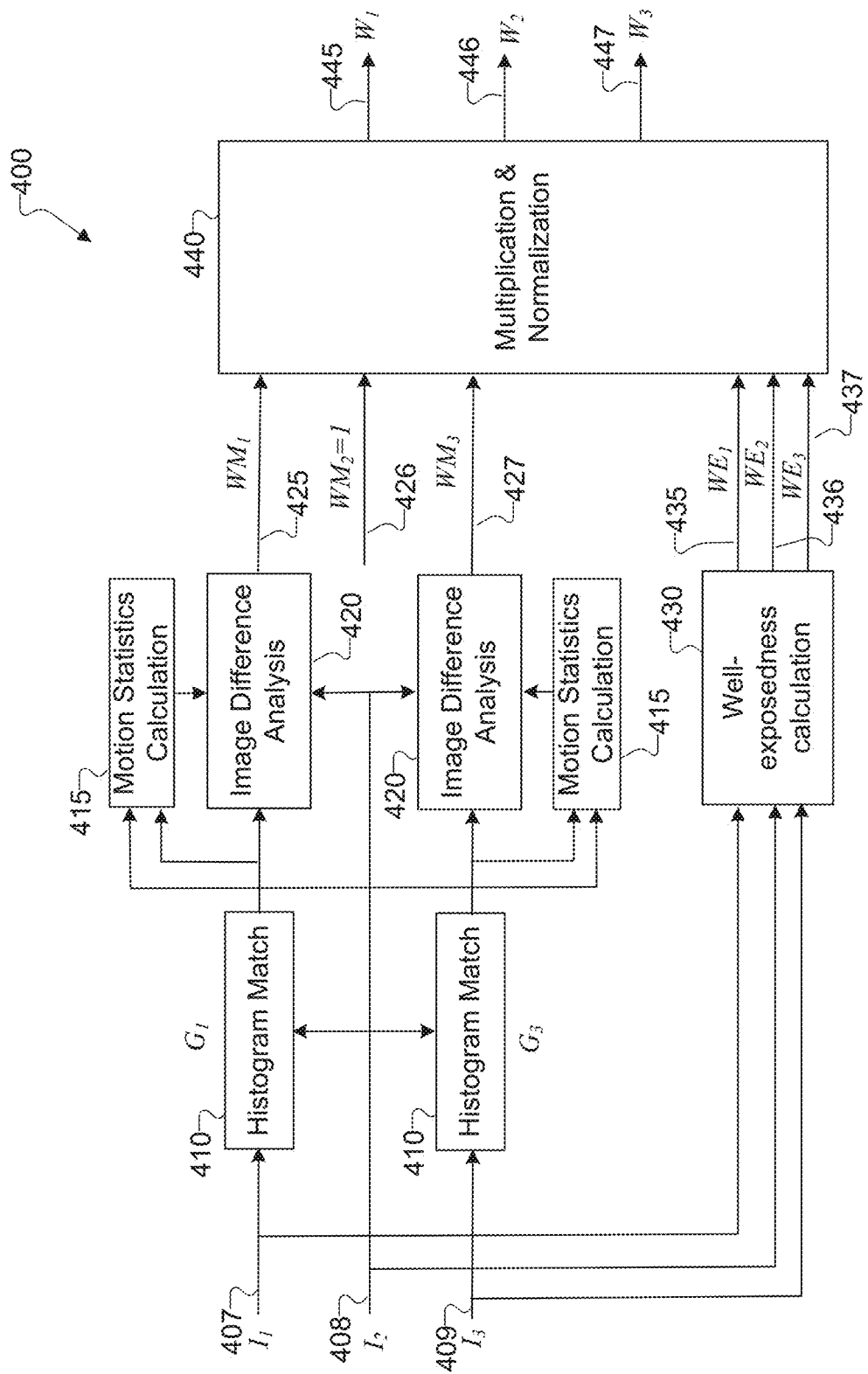
FIG. 4A illustrates an example of a block diagram for generating blending maps according to embodiments of the present disclosure.
Figure 4B:
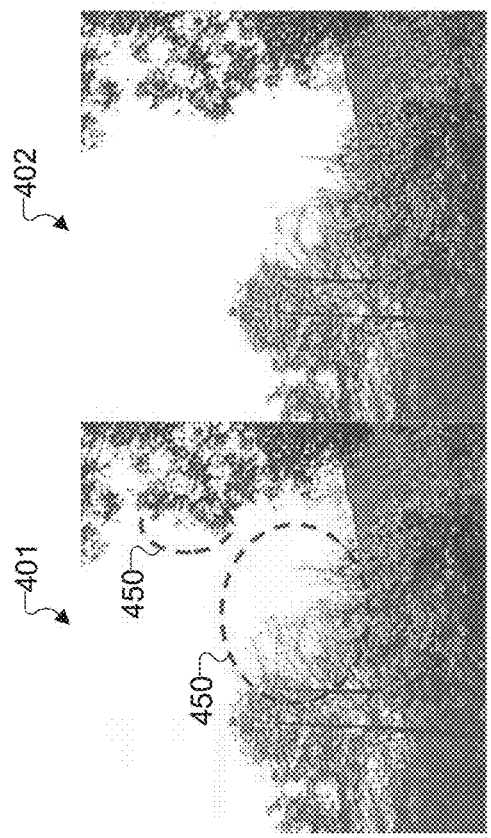
FIG. 4B illustrates an example of image difference between a first image after histogram matching with a second image and a second image to embodiments of the present disclosure.
Figure 4C:
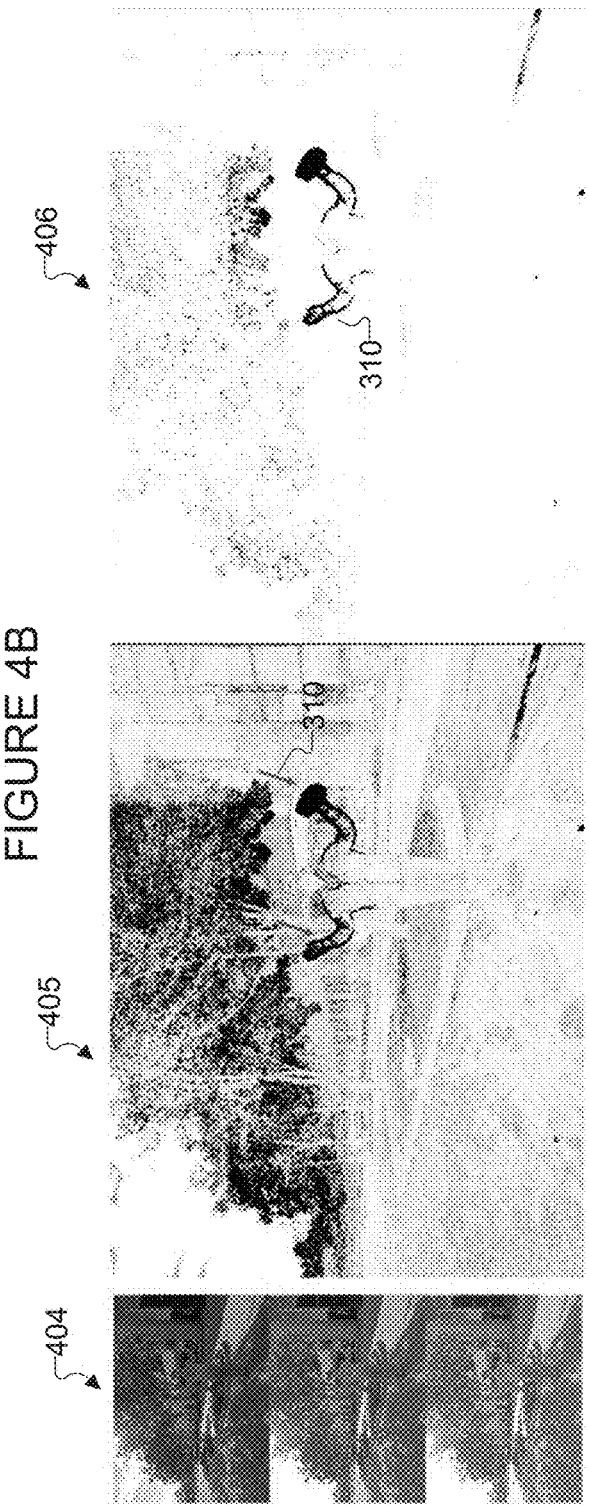
FIG. 4C illustrates an example of a constant-exposure ghosting map and a multi-exposure ghosting map according to embodiments of the present disclosure.

FIG. 4A illustrates an example of a block diagram 400 for generating blending maps according to embodiments of the present disclosure. FIG. 4B illustrates an example of image difference 450 between a first image after histogram matching with a second image 401 and a second image 402 according to embodiments of the present disclosure. FIG. 4C illustrates an example of a constant-exposure ghosting map 405 and a multi-exposure ghosting map 406 according to embodiments of the present disclosure. The embodiment of the block diagram 400 shown in FIG. 4A, the image difference 401 shown in FIG. 4B, and the constant-exposure ghosting map 405 and a multi-exposure ghosting map 406 shown in FIG. 4C are for illustration only. Other embodiments of the block diagram 400, the image difference 401, and the constant-exposure ghosting map 405 and a multi-exposure ghosting map 406 could be used without departing from the scope of this disclosure.

A blending map is a composite of a deghosting map and a well-exposed map. A deghosting map indicates where blending could happen to avoid ghost artifacts introduced by objects motion. A well-exposed map identifies a particular local area that is well-exposed, in other words, areas that carry the most useful and reliable image information.

Motion, noise and different exposures could contribute to image differences from which the deghosting maps are derived. The deghosting maps differentiate between the first source (motion) and the other two sources (noise and exposure difference). For real object motion, blending is turned down, while for the other two cases, blending is used to reduce noise and bring back more details in under- or over-exposed areas.

The blending map generation 400 receives a first image 407, a second image 408, and a third image 409. The first image 407 and the third image 409 are non-reference images and the second image 408 is the reference image. A histogram match 410 on the non-reference images, i.e. the first image 407 and the third image 409, is applied to make the brightness level the same for all the input images. The histogram match 410 holds well in normal-exposed areas, but is less efficient in under- or over-exposed areas. Compared to the deghosting algorithm for constant-exposed images, the following changes maximize blending and reduce ghost artifacts for HDR images.

The blending level is determined by the motion percentage of the image using a motion statistics calculation 415 and an image difference analysis 420. One pixel is identified as moving by comparing the image difference (histogram-matched non-reference and reference images) and a threshold based on noise level. The noise level is almost the same for constant-exposed images, but quite different for multi-exposure images. Therefore, this threshold varies with exposure level of the non-reference image.

In the motion statistics calculation 415, the motion percentage is calculated in a tile manner instead of global manner so that blending level is spatially-varying with tiles. In this way, the blending level in a static image tile will not be decreased by that in a dynamic image tile.

In the image difference analysis 420, the exposure difference values are relatively small compared to difference values caused by real motion. For example in FIG. 4B, thin branches and leaves appear in the bright area of the first image $I_1$ 407 and even visible after histogram matching with the second image $I_2$ 408, but the second image $I_2$ 408 is already saturated in that area, so an exposure difference is generated in that area. The deghosting algorithm tends to be more tolerable in under- or over-exposed areas to neglect those exposure differences.

The influence of exposure difference is reduced by the above item, but will get accumulated in texture tile and the motion percentage will be high. Therefore, a smoothing filter is applied on the image difference to generate a smaller motion percentage value.

An example of a deghosting map 405 for the first image $I_1$ 407 before the previous changes and a deghosting map 406 for the first image $I_1$ 407 after these changes are compared in FIG. 4C. The red circle area has been shown in FIG. 4B and the image difference is mainly caused by exposure difference, so the new deghosting map increases blending. The areas marked by blue arrow belong to real motion, and the blending is still rejected anyway.

In addition to avoiding ghost artifacts, blending should also keep the best parts in the multi-exposure images, which is guided by a well-exposedness calculation 430. The well-exposed value of each pixel is computed based on how close it is to an intensity value using a Gaussian curve. Generally, this value is 0.5 (range 0~1) to keep intensities that are not near zero or one. Difference choices of this value for different exposed images could automatically segment the image and achieve better deghosting performance.

The multiplication and normalization block 440 combines the deghosting maps, a first weighting map factor 425, a second weighting map factor 426, and a third weighting map factor 427 and the well-exposedness maps, including, for example, a first well-exposedness factor 435, a second well-exposedness factor 436, and a third well-exposedness factor 437 into three weight maps, including, for example, a first weight map 445, a second weight map 446, and a third weight map 447, using multiplication. To obtain a consistent result in blending, the values of the weight maps are normalized such that the sum of the weights is equal to one for each pixel.

Figure 5A:
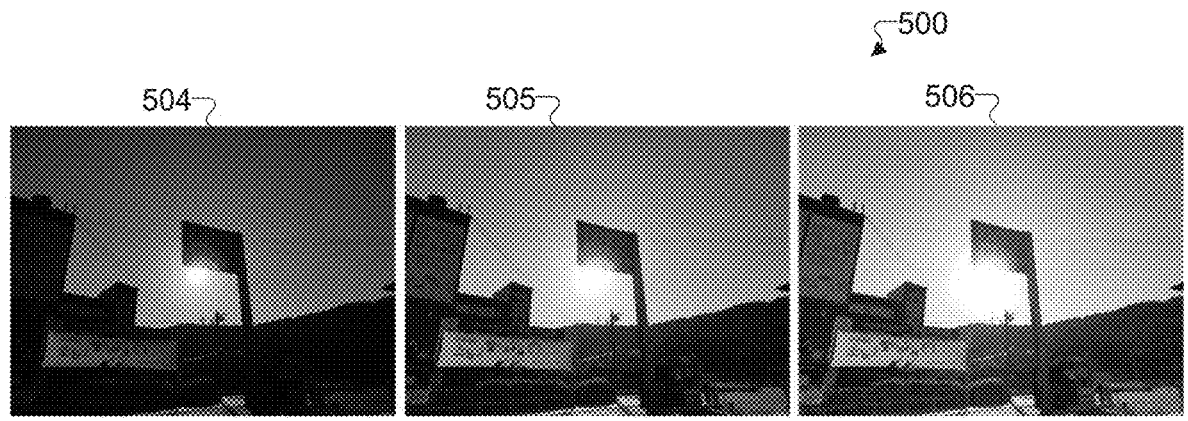
FIG. 5A illustrates an example of plurality of multi-exposure images according to embodiments of the present disclosure.
Figure 5B:
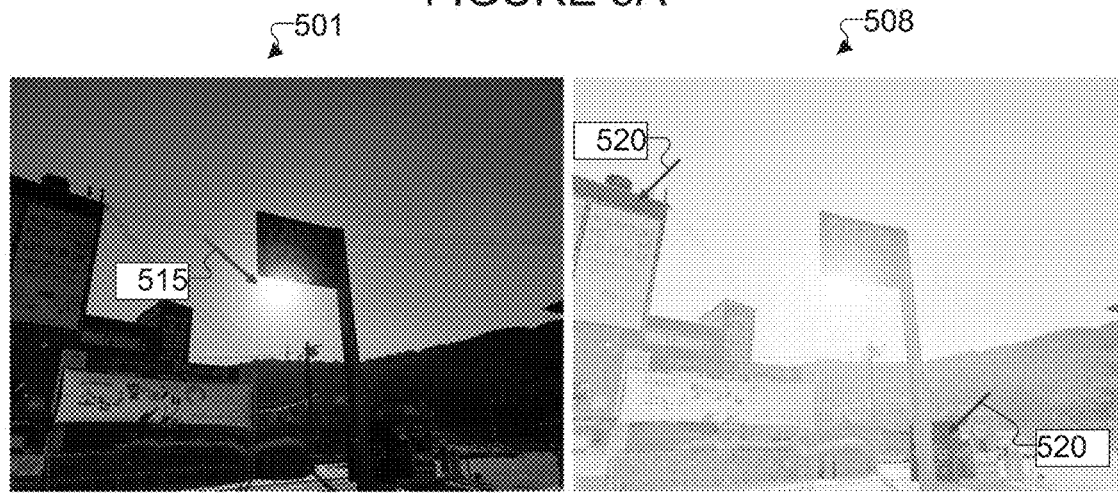
FIG. 5B illustrates an example of an 11-level exposure fusion result according to embodiments of the present disclosure.
Figure 5C:
FIG. 5C illustrates an example of an 8-level exposure fusion result according to embodiments of the present disclosure.

FIG. 5A illustrates an example of plurality of multi-exposure images 500 according to embodiments of the present disclosure. FIG. 5B illustrates an example of an 11-level exposure fusion result 501 according to embodiments of the present disclosure. FIG. 5C illustrates an example of an 8-level exposure fusion result 502 according to embodiments of the present disclosure. The embodiments of the plurality of multi-exposure images 500 shown in FIG. 5A, the 11-level exposure fusion result 501 shown in FIG. 5B, and the 8-level exposure fusion result 502 shown in FIG. 5C are for illustration only. Other embodiments of the plurality of multi-exposure images 500, the 11-level exposure fusion result 501, and the 8-level exposure fusion result 502 could be used without departing from the scope of this disclosure.

In the description of exposure fusion, a plurality of multi-exposure images 500 is used for inputs. The multi-exposure images 500 include a short-exposure image 504, a medium-exposure image 505, and a long-exposure image 506. FIG. 5B illustrates an 11-level exposure fusion result 501 along with its brighten version 508 to illustrate details lost in the saturation region 515 and the dark regions 520. FIG. 5C illustrates an 8-level exposure fusion result 502 along with its brighten version 509 to illustrate halo artifacts 525.

Exposure fusion is a method to fuse the multiple exposures into a high dynamic range image that is ready for low-dynamic display. Performing exposure fusion avoids a camera response curve calibration and tone mapping operators required for traditional HDR composition. In certain embodiments, exposure fusion is used with the reference frame as the second image $I_2$ (medium-exposure image 505). If a saturation area is moving between the first image $I_1$ (short-exposure image 504) and the second image $I_2$, the second image $I_2$ is used to fill the moving saturation region that has intensity difference from the surrounding intensity levels that are blended from the first image $I_1$. The exposure fusion technique smooths the boundary between a static saturation area and a moving saturation area.

In exposure fusion, blending is performed in a multi-resolution. The input images 500 are decomposed into a Laplacian pyramid and, at each pyramid level, blended by the Gaussian pyramid of blending maps. These blended pyramids are then collapsed to obtain the result image (501, 502). This technique is quite effective at avoiding contours or seams, but it may also lead to information loss or undesirable artifacts. FIG. 5A is the input multi-exposure images 500 and FIGS. 5B and 5C show the results of exposure fusion when the number of pyramids is 11 and 8, respectively. The 11-level exposure fusion result 501 looks natural, but the saturation region and dark region are not completely recovered. The saturation region 515 gets saturated compared to the short-exposure image 504, while the dark region 520 is just noise if looked upon at its brighten-up version 508. Though the 8-level result preserves both saturation and dark regions, halo artifacts 525 between dark and bright regions are not pleasing. It is a difficult question to keep all the information in an image without introducing halo artifacts.

Due to blending weights leakage (where the blending map is more smoothed across boundaries), the exposure fusion output may exceed the range limit of an image. After clipping the image back to the range limit, some information is lost in saturation areas (both bright regions and dark regions). The leakage in higher pyramid levels has much more influence, so this phenomenon gets worse when the number of pyramids is increased. If the weights were made local and solid, the saturation information comes back. However, more dark areas may be lost once trying to constrain the blending weights for the short-exposed image 504, because making blending weights in some areas solid will erode blending weights in other areas.

Figure 6D:
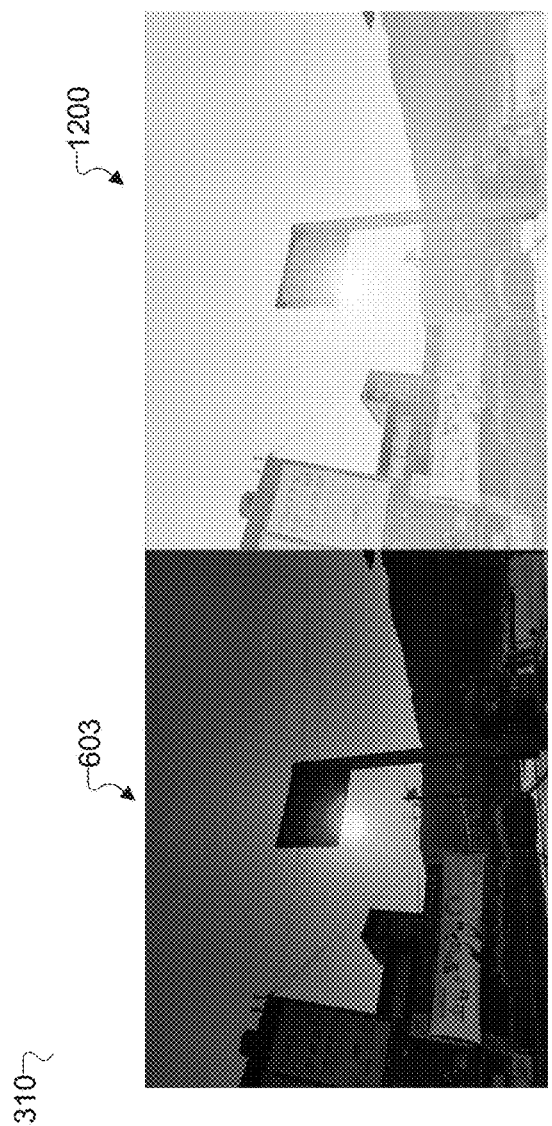
FIG. 6D illustrates an example of a first step output of the two-step weights-constrained exposure fusion 600 according to embodiments of the present disclosure.
Figure 6E:
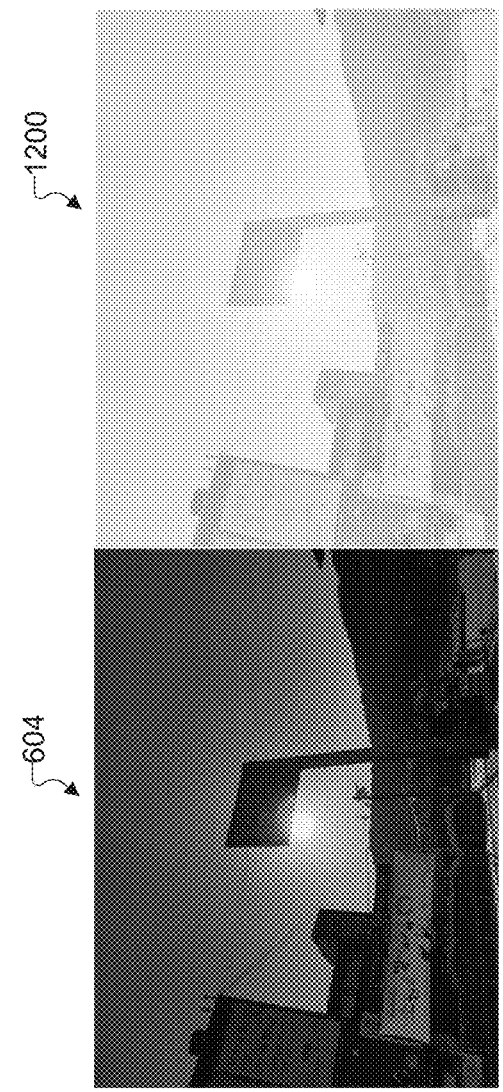
FIG. 6E illustrates an example of a second step output of the two-step weights-constrained exposure fusion 600 according to embodiments of the present disclosure.

FIG. 6A illustrates an example of a two-step weights-constrained exposure fusion 600 according to embodiments of the present disclosure. FIG. 6B illustrates an example of an original blending weight map 601 at level 8 for the short-exposed image according to embodiments of the present disclosure. FIG. 6C illustrates an example of a constrained blending weight map 602 at level 8 for the short-exposed image according to embodiments of the present disclosure. FIG. 6D illustrates an example of a first step output 603 of the two-step weights-constrained exposure fusion 600 according to embodiments of the present disclosure. FIG. 6E illustrates an example of a second step output 604 of the two-step weights-constrained exposure fusion 600 according to embodiments of the present disclosure. The embodiments of the two-step weights-constrained exposure fusion 600 shown in FIG. 6A, the original blending weight map 601 shown in FIG. 6B, the constrained blending weight map 602 shown in FIG. 6C, the first step output 603 shown in FIG. 6D, and the second step output 604 shown in FIG. 6E are for illustration only. Other embodiments of the two-step weights-constrained exposure fusion 600, the original blending weight map 601, the constrained blending weight map 602, the first step output 603, and the second step output 604 could be used without departing from the scope of this disclosure.

In the two-step weights-constrained exposure fusion 600, the recovery of saturation and dark details is divided into two steps of pyramid blending with different levels. For purposes of comparison, the brighten version 605 of the first step output is shown in FIG. 6D and the brighten version 606 of the second step output is shown with FIG. 6E. A ghost-free first image 609, a second image 610, and a ghost-free third image 610 are provided as inputs of the two-step weights-constrained exposure fusion 600. The ghost-free first image 609 and the ghost-free third image 610 are generated as part of the synthesis block 220. The ghost-free first image 609 is the output from the synthesis block 220 for the short-exposure image 206 and the ghost-free third image 611 is the output from the synthesis block 220 for the long-exposure image 208. The second image 610 is unchanged in the synthesis block 220. The ghost-free first image 609 and the ghost-free third image 611 are non-reference images, and the second image 610 is the reference image.

The first step uses a high level of weights-constrained pyramid blending 615 to preserve saturation regions and reduce positive halo artifacts in 502, and the second step brings dark details back by adopting a lower level of pyramid blending 620. As the second step has fewer levels (close to alpha blending), the second step will have negligible influence on the first step output in bright areas, but simultaneously recover the dark details that are diminished in the 11-level exposure fusion result 501.

A block diagram for the two-step weights-constrained exposure fusion 600 is given in FIG. 6A. In the first step, the short-exposed image $I_1'$ and medium-exposed image $I_2$ are blended with blending maps $W_1$ and $1-W_1$. Relatively high levels are need to reduce halo artifacts; but the weights leakage in saturation area can be constrained to make sure its value will not exceed the range limit. The blending weight map 601 for the ghost-free first image $I_1'$ at level 8 is shown in FIG. 6B and its constrained map 602 is shown in FIG. 6C. This constraint is performed at a certain high level in order to not influence the smoothing effects. The first step output 603 for the above example is shown in FIG. 6D. The saturation area looks similar to the ghost-free first image $I_1'$ with less eye-catching halo artifacts and the brightness of the remaining area is close to the second image $I_2$. The clipped dark areas are still present in the first step output 603. The second step recovers the clipped areas by blending the first step output and histogram matched third-image $I_3'$. The purpose of histogram matching 310 the ghost-free third image $I_3'$ is to bring the intensity level of the third image $I_3'$ closer to the first blending output, which will reduce the number of levels needed in the second step. Notice that the histogram-matched third image $I_3'$ still has those dark details but in a lower intensity value. The output 604 in FIG. 6E shows clipped dark areas no longer exist.

Figure 7:
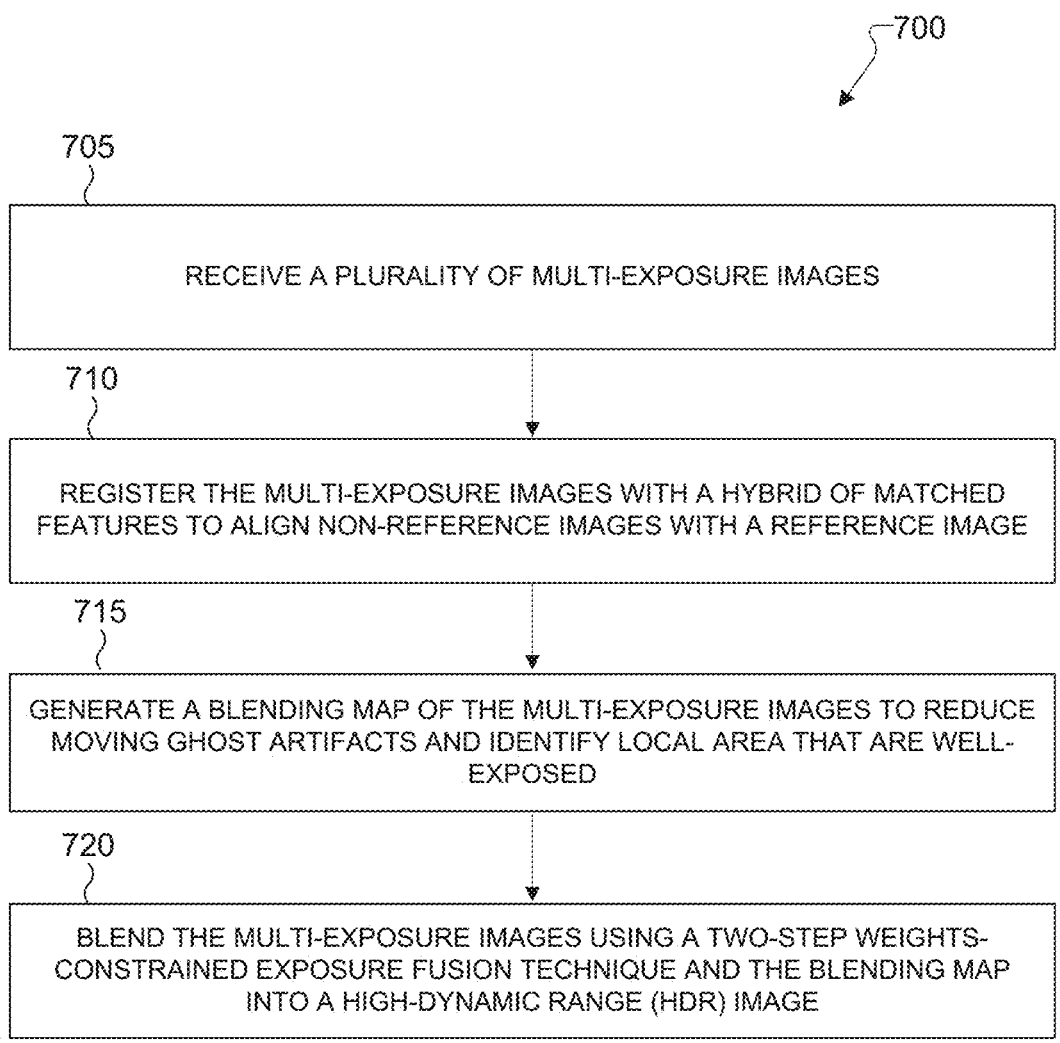
FIG. 7 illustrates an exemplar flow diagram for compositing high dynamic range images according to the various embodiments of the present disclosure.

FIG. 7 illustrates an exemplar flow diagram 700 for compositing high dynamic range images according to the various embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in FIG. 7 can be performed by the electronic device 101 in FIG. 1.

In operation 1305, the electronic device 101 receives a plurality of multi-exposure images. The multi-exposure images can include a low-exposure image (first image), a medium-exposure image (second image), and a high-exposure image (third image). One of the multi-exposure images is selected as a reference image, such as the second image, and the remaining images are considered non-reference images, such as the first image and the third image. In certain embodiments, the medium image or reference image is an auto-exposure image. That is the auto-exposure image is an image capture with a standard or default exposure time. The low-exposure image or short-exposure image has a reduced exposure compared to the reference image. The high-exposure image or long-exposure image has an increased or extended exposure compared to the reference image.

In operation 1310, the electronic device 101 registers the multi-exposure images with a hybrid of matched features to align the non-reference images with a reference image. The hybrid of matched features includes combining ORB features with local features from a block search.

In operation 1315, the electronic device 101 generates blending maps of the multi-exposure images to reduce moving ghost artifacts and identify local areas that are well-exposed.

The processor 101 synthesizes the new non-reference images in which moving area are filled by the histogram-matched reference image. The processor 101 uses this process to produce a ghost-free first image and a ghost-free third image.

In operation 1320, the electronic device 101 blends the plurality of multi-exposure images weighted by the blending maps using a two-step weights-constrained exposure technique an HDR image. The two-step weights-constrained exposure technique includes perform a weight-controlled pyramid blending between the low-exposure image and the medium-exposure image; and perform a pyramid blending between the output of the weight-controlled pyramid blending and a histogram-matched high-exposure image to output a blended image.

The blended image further receives tone-mapping, noise filtering and edge enhancement to output as an HDR image.

Although FIG. 7 illustrates an example process for compositing high dynamic range images, various changes could be made to FIG. 7. For example, while shown as a series of steps, various steps in each figure could overlap, occur in parallel, occur in a different order, or occur multiple times.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. An electronic device for compositing high dynamic range frames comprising:
    a camera configured to capture a plurality of image frames including a low-exposure frame, a medium-exposure frame that is a reference frame, and a high-exposure frame; and
    a processor coupled to the camera, the processor configured to:
        register the plurality of image frames with a hybrid of matched features to align the low-exposure frame and the high-exposure frame with the reference frame;
        generate blending maps of the plurality of image frames to reduce moving ghost artifacts and identify local areas that are well-exposed in the plurality of image frames;
        blend the plurality of image frames weighted by the blending maps using a two-step weight-constrained exposure fusion technique into a blended frame, wherein a histogram match is performed between successive blendings in the two-step weight-constrained exposure fusion technique; and apply tone-mapping to the blended frame to generate a high dynamic range (HDR) frame.

2. The electronic device of claim 1, wherein:
the medium-exposure frame is an auto-exposure frame;
the low-exposure frame is associated with a reduced exposure compared to the auto-exposure frame; and
the high-exposure frame is associated with an increased exposure compared to the auto-exposure frame.

3. The electronic device of claim 1, wherein, to register the plurality of image frames, the processor is configured to combine Oriented features from accelerated segment test (FAST) and Rotated Binary robust independent elementary features (BRIEF) (ORB) features and local features from a block search.

4. The electronic device of claim 1, wherein, to generate the blending maps, the processor is configured to add local analysis of motion, textures, and a well-exposedness metric.

5. The electronic device of claim 1, wherein, to perform the two-step weight-constrained exposure fusion technique, the processor is configured to:
perform a weight-controlled pyramid blending between the low-exposure frame and the medium-exposure frame; and
perform a pyramid blending between an output of the weight-controlled pyramid blending and a histogram-matched high-exposure frame to output the blended frame.

6. The electronic device of claim 1, wherein:
the processor is further configured to synthesize a ghost-free low-exposure frame and a ghost-free high-exposure frame in which moving areas are filled by a histogram matched to the medium-exposure frame, and
the ghost-free low-exposure frame, the ghost-free high-exposure frame, and the medium-exposure frame comprise inputs in the two-step weight-constrained exposure fusion technique.

7. A method for compositing high dynamic range frames comprising:
receiving a plurality of image frames including a low-exposure frame, a medium-exposure frame that is a reference frame, and a high-exposure frame;
registering the plurality of image frames with a hybrid of matched features to align the low-exposure frame and the high-exposure frame with the reference frame;
generating blending maps of the plurality of image frames to reduce moving ghost artifacts and identify local areas that are well-exposed in the plurality of image frames;
blending the plurality of image frames weighted by the blending maps using a two-step weight-constrained exposure fusion technique into a blended frame, wherein a histogram match is performed between successive blendings in the two-step weight-constrained exposure fusion technique; and
applying tone-mapping to the blended frame to generate a high dynamic range (HDR) frame.

8. The method of claim 7, wherein:
the medium-exposure frame is an auto-exposure frame;
the low-exposure frame is associated with a reduced exposure compared to the auto-exposure frame; and
the high-exposure frame is associated with an increased exposure compared to the auto-exposure frame.

9. The method of claim 7, wherein registering the plurality of image frames comprises combining Oriented features from accelerated segment test (FAST) and Rotated Binary robust independent elementary features (BRIEF) (ORB) features and local features from a block search.

10. The method of claim 7, wherein generating the blending maps comprises adding local analysis of motion, textures, and a well-exposedness metric.

11. The method of claim 7, wherein the two-step weight-constrained exposure fusion technique includes:
performing a weight-controlled pyramid blending between the low-exposure frame and the medium-exposure frame; and
performing a pyramid blending between an output of the weight-controlled pyramid blending and a histogram-matched high-exposure frame to output the blended frame.

12. The method of claim 7, further comprising synthesizing a ghost-free low-exposure frame and a ghost-free high-exposure frame in which moving areas are filled by a histogram matched to the medium-exposure frame,
wherein the ghost-free low-exposure frame, the ghost-free high-exposure frame, and the medium-exposure frame comprise inputs in the two-step weight-constrained exposure fusion technique.

13. A non-transitory computer readable medium embodying a computer program, the computer program comprising computer readable program code that when executed causes at least one processor to:
obtain a plurality of image frames including a low-exposure frame, a medium-exposure frame that is a reference frame, and a high-exposure frame;
register the plurality of image frames with a hybrid of matched features to align the low-exposure frame and the high-exposure frame with the reference frame;
generate blending maps of the plurality of image frames to reduce moving ghost artifacts and identify local areas that are well-exposed in the plurality of image frames;
blend the plurality of image frames weighted by the blending maps using a two-step weight-constrained exposure fusion technique into a blended frame, wherein a histogram match is performed between successive blendings in the two-step weight-constrained exposure fusion technique; and
apply tone-mapping to the blended frame to generate a high dynamic range (HDR) frame.

14. The non-transitory computer readable medium of claim 13, wherein:
the medium-exposure frame is an auto-exposure frame;
the low-exposure frame is associated with a reduced exposure compared to the auto-exposure frame; and
the high-exposure frame is associated with an increased exposure compared to the auto-exposure frame.

15. The non-transitory computer readable medium of claim 13, wherein the computer readable program code that when executed causes the at least one processor to register the plurality of image frames comprises:
computer readable program code that when executed causes the at least one processor to combine Oriented features from accelerated segment test (FAST) and Rotated Binary robust independent elementary features (BRIEF) (ORB) features and local features from a block search.

16. The non-transitory computer readable medium of claim 13, wherein the computer readable program code that when executed causes the at least one processor to generate the blending maps comprises:

computer readable program code that when executed causes the at least one processor to add local analysis of motion, textures, and a well-exposedness metric.

17. The non-transitory computer readable medium of claim 13, wherein the computer readable program code that when executed causes the at least one processor to blend the plurality of image frames using the two-step weight-constrained exposure fusion technique comprises:
    computer readable program code that when executed causes the at least one processor to:
        perform a weight-controlled pyramid blending between the low-exposure frame and the medium-exposure frame; and
        perform a pyramid blending between an output of the weight-controlled pyramid blending and a histogram-matched high-exposure frame to output the blended frame.

18. The electronic device of claim 1, wherein, to generate the blending maps, the processor is configured to:
    perform an image difference analysis using the image frames to generate multiple weight factors;
    perform a well-exposedness calculation using the image frames to generate multiple well-exposedness factors; and
    perform a multiplication and normalization function using the weight factors and the well-exposedness factors to generate multiple weight maps.

19. The method of claim 7, wherein generating the blending maps comprises:
    performing an image difference analysis using the image frames to generate multiple weight factors;
    performing a well-exposedness calculation using the image frames to generate multiple well-exposedness factors; and
    performing a multiplication and normalization function using the weight factors and the well-exposedness factors to generate multiple weight maps.

20. The non-transitory computer readable medium of claim 13, wherein the computer readable program code that when executed causes the at least one processor to generate the blending maps comprises:
    computer readable program code that when executed causes the at least one processor to:
        perform an image difference analysis using the image frames to generate multiple weight factors;
        perform a well-exposedness calculation using the image frames to generate multiple well-exposedness factors; and
        perform a multiplication and normalization function using the weight factors and the well-exposedness factors to generate multiple weight maps.

\* \* \* \* \*